United States Patent
Hsu et al.

(10) Patent No.: US 7,280,489 B2
(45) Date of Patent: Oct. 9, 2007

(54) PRIME NUMBERING ADDRESS ALLOCATION METHOD AND UNIQUE NUMBERING ADDRESS ALLOCATION METHOD USING THE SAME IN WIRELESS MULTI-HOP NETWORK

(75) Inventors: Yuan-Ying Hsu, Taipei (TW); Jen-Shun Yang, Hsinchu (TW); Chien-Chao Tseng, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 449 days.

(21) Appl. No.: 11/067,687

(22) Filed: Mar. 1, 2005

(65) Prior Publication Data

US 2006/0198320 A1 Sep. 7, 2006

(51) Int. Cl.
H04L 12/28 (2006.01)

(52) U.S. Cl. .................. 370/256; 370/310.1; 370/338; 709/245; 709/238

(58) Field of Classification Search ............. 370/310.1, 370/338, 349, 254–256; 709/245, 238, 200
See application file for complete search history.

(56) References Cited

U.S. PATENT DOCUMENTS 6,601,093 B1 7/2003 Peters

2003/0023753 A1* 1/2003 Rychlicki ................... 709/245
2004/0174904 A1 9/2004 Kim et al.

OTHER PUBLICATIONS

R. Droms; *Dynamic Host Configuration Protocol*; Mar. 1997; pp. 1-45 (as originally printed).
Jaehoon Paul Jeong et. al.; *Ad Hoc IP Address Autoconfiguration*; Oct. 20, 2003; pp. 1-13.
Hongbo Zhou et. al.; *Prophet Address Allocation For Large Scale MANETs*; 2003; IEEE; pp. 1304-1311.
Sanket Nesargi et. al.; *MANETconf: Configuration of Hosts in a Mobile Ad Hoc Network*; pp. 1-10, 2002.

* cited by examiner

*Primary Examiner*—George Eng
*Assistant Examiner*—Marcos L. Torres
(74) *Attorney, Agent, or Firm*—Bacon & Thomas, PLLC (57) ABSTRACT

A prime numbering address allocation method in wireless multi-hop network, in which address 1 is assigned to a root host which is the first host joining the wireless multi-hop network, the root host allocates all prime numbers sequentially to new hosts attached to it, and a non-root host allocates addresses as its own address multiplied by a prime number which starts from the biggest prime factor of its own address to new hosts attached to it.

16 Claims, 7 Drawing Sheets

PRIME NUMBERING ADDRESS ALLOCATION METHOD AND UNIQUE NUMBERING ADDRESS ALLOCATION METHOD USING THE SAME IN WIRELESS MULTI-HOP NETWORK

BACKGROUND OF THE INVENTION

1. Field of the Invention

The present invention generally relates to address allocation in wireless multi-hop network and, more particularly, to a prime numbering address allocation method and a unique numbering address allocation method using the same in wireless multi-hop network.

2. Description of the Related Art

A wireless multi-hop network usually is a wireless network without the support of base stations, such as a mobile ad-hoc network (MANET), sensor network, and wireless mesh network (WMN). Without base stations, wireless networks provide high flexibility but have a limitation of applying existing communication methods designed for infrastructure directly, for example, the address allocation in a wireless multi-hop network is more complicated to maintain efficiency and uniqueness.

Traditionally, a host can configure its address statically or dynamically. In the static configuration, users need to acquire an available address in advance and manually configure the address. However, it is not reasonable for users to do manual configuration in a flexible multi-hop network. The other choice is dynamic configuration, which allows a host to configure an address dynamically, such as Dynamic Host Configuration Protocol (DHCP).

Figure 1:
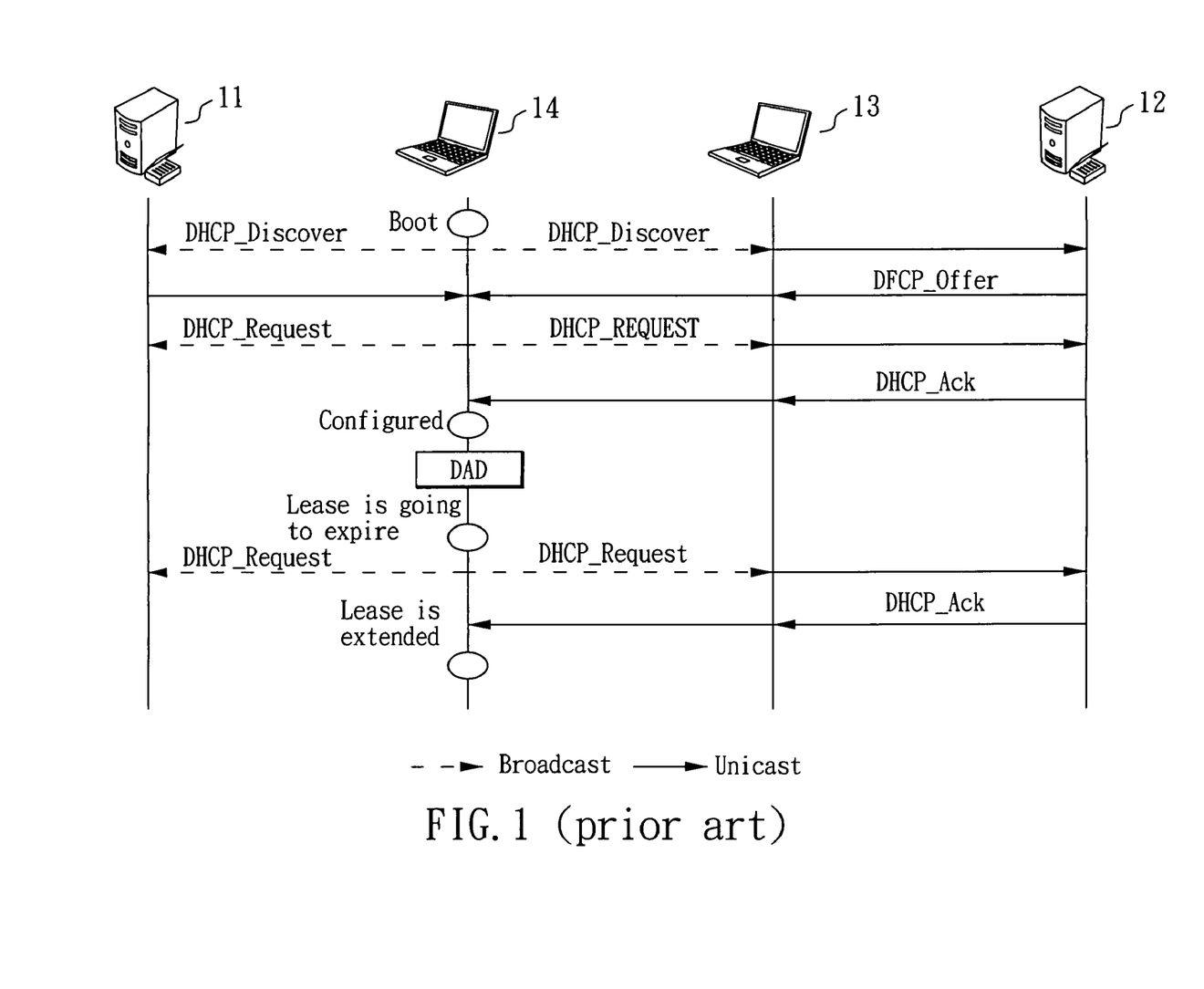
FIG. 1 shows the message flows of DHCP.

DHCP is a centralized allocation mechanism, which deploys at least one fixed server to manage all addresses in the network. FIG. 1 shows the message flows of DHCP. As shown, there are two DHCP servers 11, 12 and one DHCP relay 13 for DHCP server 12. When a new host 14 joins a multi-hop wireless network, it broadcasts a DHCP_Discover message to ask for an address. All hosts in the network except DHCP relay 13 will help rebroadcast such message until to DHCP servers 11, 12, whereas DHCP relay 13 will unicast the message to the DHCP server 12 directly. Upon receiving DHCP_Discover message, each of the DHCP servers 11, 12 will allocate an address and send DHCP_Offer message with the address back to the new host 14. Therefore, the new host 14 might receive multiple DHCP_Offer messages, and it has to choose one and broadcasts DHCP_Request to inform all servers 11, 12 its choice, for example server 12. The chosen server 12 will check if such address is really available and send DHCP_Ack to the new host 14. At this time, the new host 14 can configure the address as its address and start the process of DAD (Duplicate Address Detection) to guarantee that no other hosts in the network use such an address. After a lease time, which is assigned by the server 12 notifying how long the host 14 can use such address, the host 14 reclaims the address by DHCP_Request. If the address is still available, the server 12 will send a DHCP_Ack message to the host 14. Otherwise, a DHCP_Nack message will be sent and the host 14 needs to perform the whole procedure starting from broadcasting DHCP_Discover again.

In view of the message flows of DHCP, it is known that, in dynamic configurations, broadcasts are usually necessary to acquire an address or detect address confliction. However, broadcast in a wireless multi-hop network is very expensive and may cause broadcast storm problem.

In the known address allocation mechanisms, self-configuration is a distributed address allocation mechanism, in which a host can configure its address by itself according to different factors, such as its hardware address (S. Cheshire, B. Aboba, and E. Guttman, Dynamic Configuration of IPv4 Link-Local Addresses, draft-ietf.zeroconf-ipv4-linklocal-17.txt, IETF Zeroconf Working Group, July 2004; S. Thomson and T. Narten, IPv6 Stateless Address Autoconfiguration, RFC 2462, December 1998) or a random number (C. E. Perkins, J. T. Malinen, R. Wakikawa, E. M. Belding-Royer, and Y. Sun, IP Address Autoconfiguration for Ad Hoc Networks, draft-ietfmanet-autoconf-01.txt, IETF MANET Working Group, July 2000). Since a self-configured address is generated by an individual host, the address has to be checked by DAD to confirm that it is not occupied by other hosts. Therefore, broadcasts are still necessary to detect address confliction.

MANETconf (S. Nesargi, and R. Prakash, MANETconf: Configuration of Hosts in a Mobile Ad Hoc Network, INFOCOM 2002) is also a distributed method of address allocation in MANET by making all hosts record used addresses, wherein a new host acquires an address from one of its neighbors, and the neighbor finds an address not existing in its record and asks for confirmation by all other hosts in the MANET. If the address is not used by any other host, it will be assigned to the new coming host. In MANETconf, since confirmations are required from all other hosts, broadcasts are still required.

Prophet address allocation (H. Zhou, L. M. Ni, and M. W. Mutka, Prophet address allocation for large scale MANETs, INFOCOM 2003) tries to find a function which can generate a unique sequence of addresses for each host to be assigned in order. As a result, each host can directly assign addresses in the order of its address sequence without asking other hosts. However, it is quite complex to maintain uniqueness between sequences, and the uniqueness is almost impossible while the address space is small. As a result, prophet address allocation is limited in a MANET with large address space.

In US Publication No. US20040174904A1 for a "Method of allocating IP address and detecting duplication of IP address in an ad-hoc network environment", each host maintains a history table and a DAD table. The history table of a host stores the address history information of the host. The DAD table stores all neighbor address information. An 'HELLO' message is sent periodically between neighbors to update DAD tables. When a host needs an address, it sends a request message to its neighbors. If a neighbor finds such address in its DAD table, it will send a response message with an available message to the host, whereas other neighbors finding no such addresses in their DAD tables keep silence. If the host receives a response message from its neighbors, it sends a request message with such address for duplicate detection again. The process of duplicate detection will continue until no response message is received for N times. Such a method does not involve a broadcast in the whole network. However, 'HELLO' messages between neighbors are always sent periodically. This still cause lots of signal overhead in the network.

BRIEF SUMMARY OF THE INVENTION

Accordingly, an embodiment of the present invention is directed to a prime numbering address allocation method in wireless multi-hop network, which guarantees that addresses assigned by different hosts are exclusive.

Another embodiment of the present invention is directed to a unique numbering address allocation method in wireless multi-hop network, which achieves address solicitation and duplicate detection without broadcasting.

To achieve these and other advantages, and in accordance with the purpose of the present invention as embodied and broadly described, there is provided a prime numbering address allocation method in wireless multi-hop network, comprising the steps of: assigning address 1 to a root host which is the first host joining the wireless multi-hop network; assigning, by the root host, all prime numbers sequentially to new hosts attached to the root host; and assigning, by a host that is not the root host, addresses as its own address multiplied by a prime number which starts from the biggest prime factor of its own address to new hosts attached to the host.

Also in accordance with the present invention, there is provided a unique numbering address allocation method in wireless multi-hop network, comprising: a neighbor discovering step, in which, when joining in the network, a new host broadcasts a message for discovering neighbor to its neighbor hosts, and the new host is assigned with an address 1 if no response is received; an address offering step, in which, upon receiving the message for discovering neighbors from the new host, each neighbor host assigns an address as its own address multiplied by a prime number which starts from the biggest prime factor of its own address and is next to the previous one allocated by the neighbor host, and sends a message for offering address embedded with the assigned address to the new host; an address choosing step, in which, upon receiving the message for offering address, the new host chooses one of the assigned addresses as its address; and an address confirming step, in which, the chosen proxy sends an acknowledge message to the new host for confirmation.

Additional features and advantages of the present invention will be set forth in part in the description which follows, and in part will be obvious from the description, or may be learned by practice of the present invention. The features and advantages of the present invention will be realized and attained by means of the elements and combinations particularly pointed out in the henceforth appended claims.

It is to be understood that both the foregoing general description and the following detailed description are exemplary and explanatory only and are not restrictive of the present invention, as claimed.

The accompanying drawings, which are incorporated in and constitute a part of this specification, illustrate several embodiments of the present invention and together with the description, serve to explain the principles of the present invention.

DESCRIPTION OF THE EMBODIMENTS

Reference will now be made in detail to present embodiments of the present invention, examples of which are illustrated in the accompanying drawings. Wherever possible, the same reference numbers will be used throughout the drawings to refer to the same or like parts.

Figure 2:
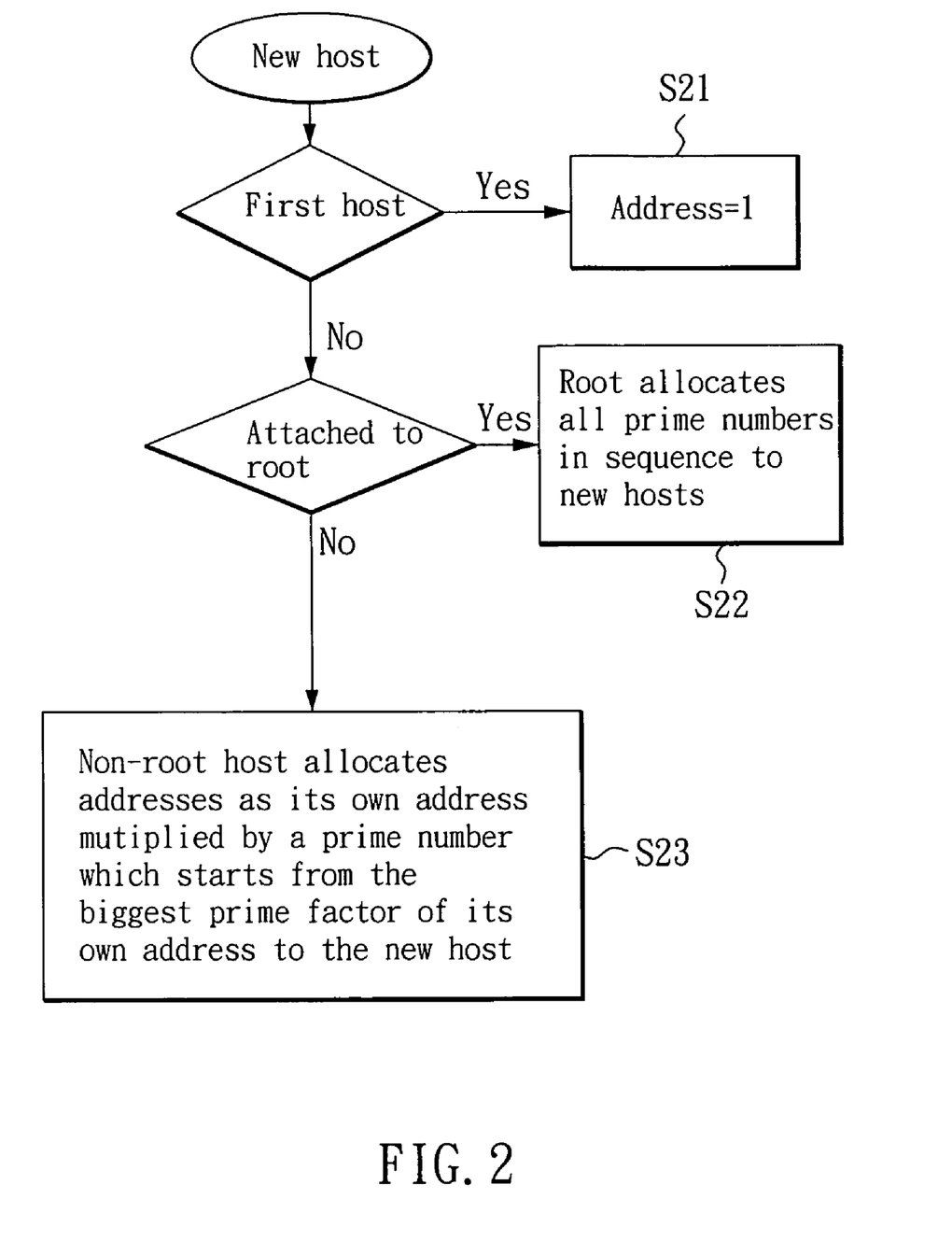
FIG. 2 is a flowchart that illustrates the prime numbering address allocation method in wireless multi-hop network in accordance with the present invention.
Figure 3:
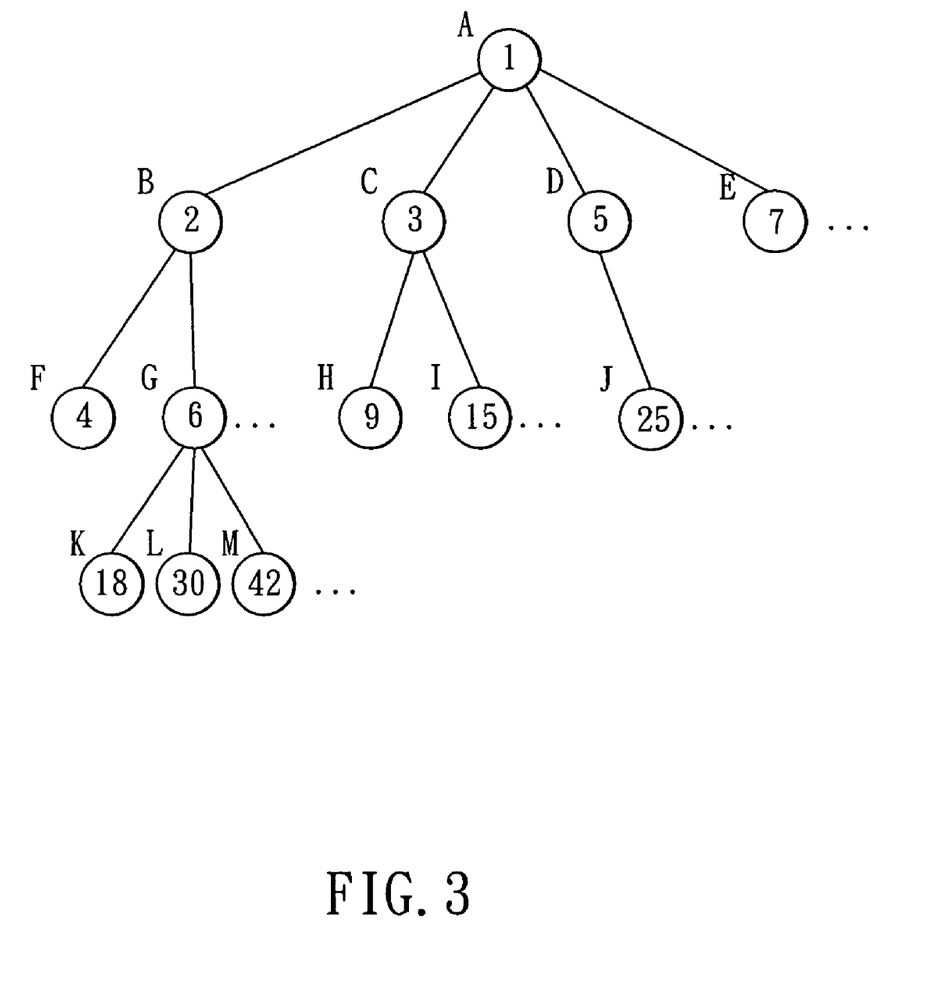
FIG. 3 is an example of address allocation tree system corresponding to the addresses allocated by the prime numbering address allocation method.

FIG. 2 is a flowchart that illustrates the prime numbering address allocation method in wireless multi-hop network, and FIG. 3 is an example of address allocation tree structure corresponding to the addresses allocated by the method. In the present invention, each host is configured as a DHCP proxy, so that all hosts are eligible to assign addresses and a new host can just acquire an address from its neighbors.

To allocate a unique address to a new host, as shown in FIG. 2 and FIG. 3, if the new host is the first host A joining a wireless multi-hop network, the host A is the root of a tree with address 1 (step S21). If the new host is attached to the root host, the root host (host A) allocates a prime number, next to the previous one allocated by the root host, to the new host (step S22). That is, the root host (host A) can allocate all prime numbers sequentially to new hosts attached to it, and thus, as shown in FIG. 3, the hosts B, C, D, E, . . . attached to the root host are assigned with addresses {2, 3, 5, 7 . . . }. Host A is the parent of hosts B, C, D, E, . . . , and on the contrary, hosts B, C, D, E, . . . are the children of host A. If the new host is attached to a non-root host (a host that is not the first one joining the network), the non-root host allocates an address to the new host (step S23), wherein the allocated address is the address of the non-root host multiplied by a prime number which starts from the biggest prime factor of the address of the non-root host and is next to the previous one allocated by the non-root host. That is, the non-root host can allocate addresses as its own address multiplied by a prime number which starts from the biggest prime factor of its own address. Accordingly, as shown in FIG. 3, for the host B with address {2}, the biggest prime factor of 2 is 2, so the order of addresses it can assign to hosts F, G, . . . is {2*2=4, 2*3=6, . . . }, in which host B is the parent of hosts F, G, . . . , and on the contrary, hosts F, G, . . . are the children of host B. Similarly, for the host (G) with address {6}, the biggest prime factor of 6 is 3, so the order of addresses it can assign to hosts K, L, M, . . . is {6*3=18, 6*5=30, 6*7=42, . . . }, in which host G is the parent of hosts K, L, M, . . . , and on the contrary, hosts K, L, M, . . . are the descendents of host G. Based on the above prime address allocation process, each address can be only generated by a single host. Besides, each host can easily know the address of its parent host, which is its address divided by the biggest prime factor of its address.

Figure 4:
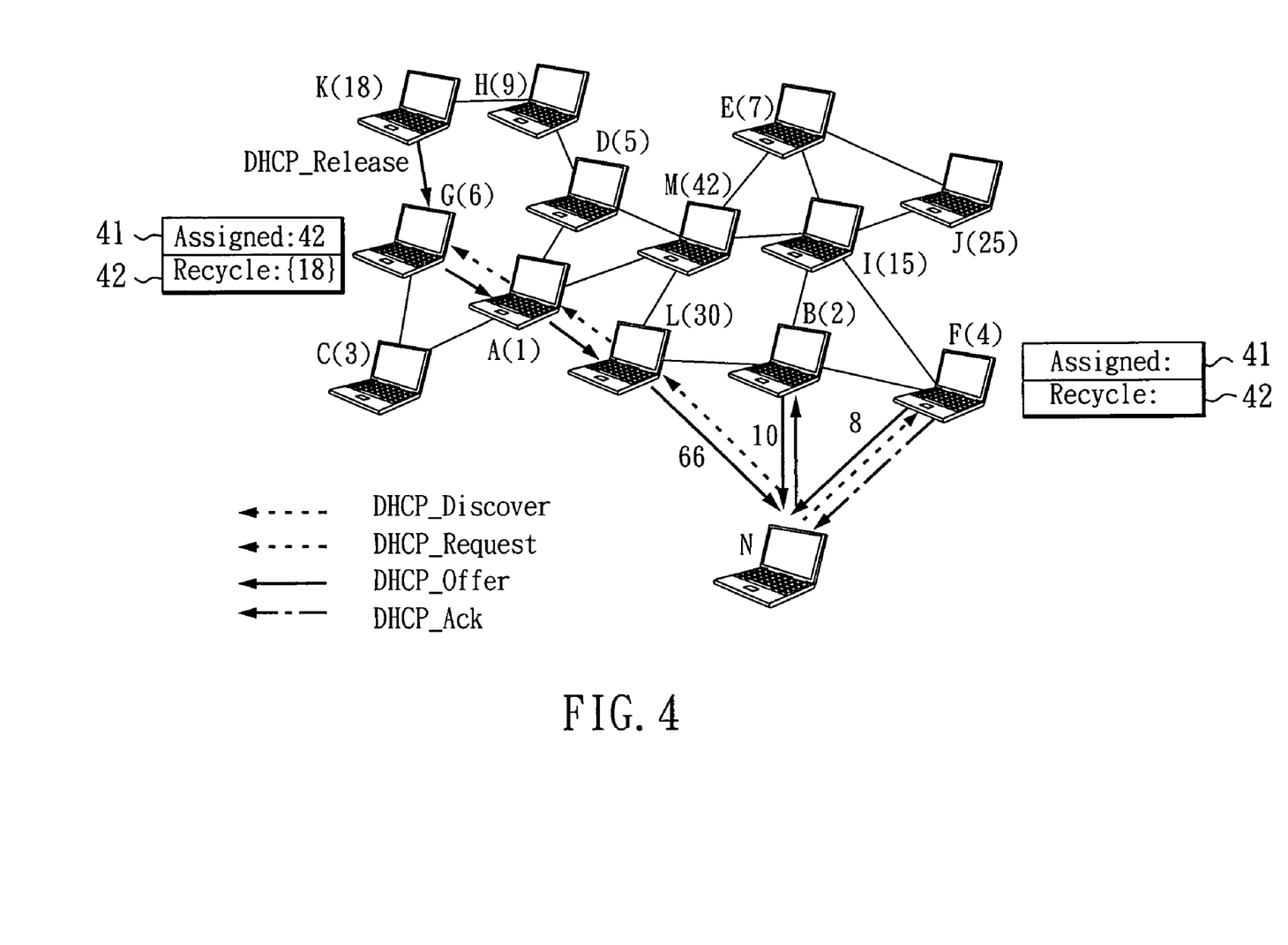
FIG. 4 is a diagram that illustrates an exemplary network topology with an address space of 128 for those hosts in FIG. 3.
Figure 5:
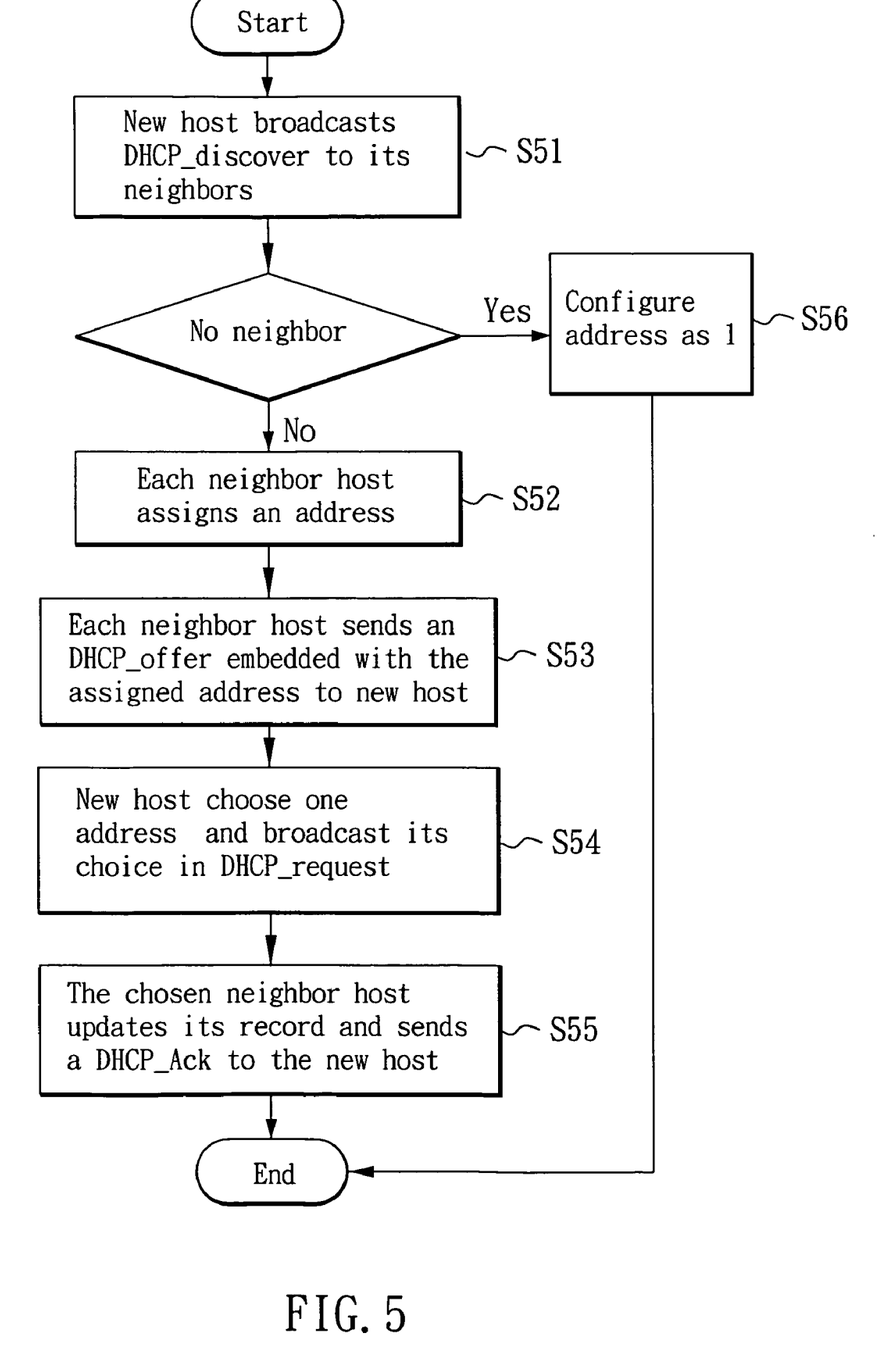
FIG. 5 is a flowchart of acquiring an address for a new host in accordance with the unique numbering address allocation method in wireless multi-hop network of the present invention.
Figure 6:
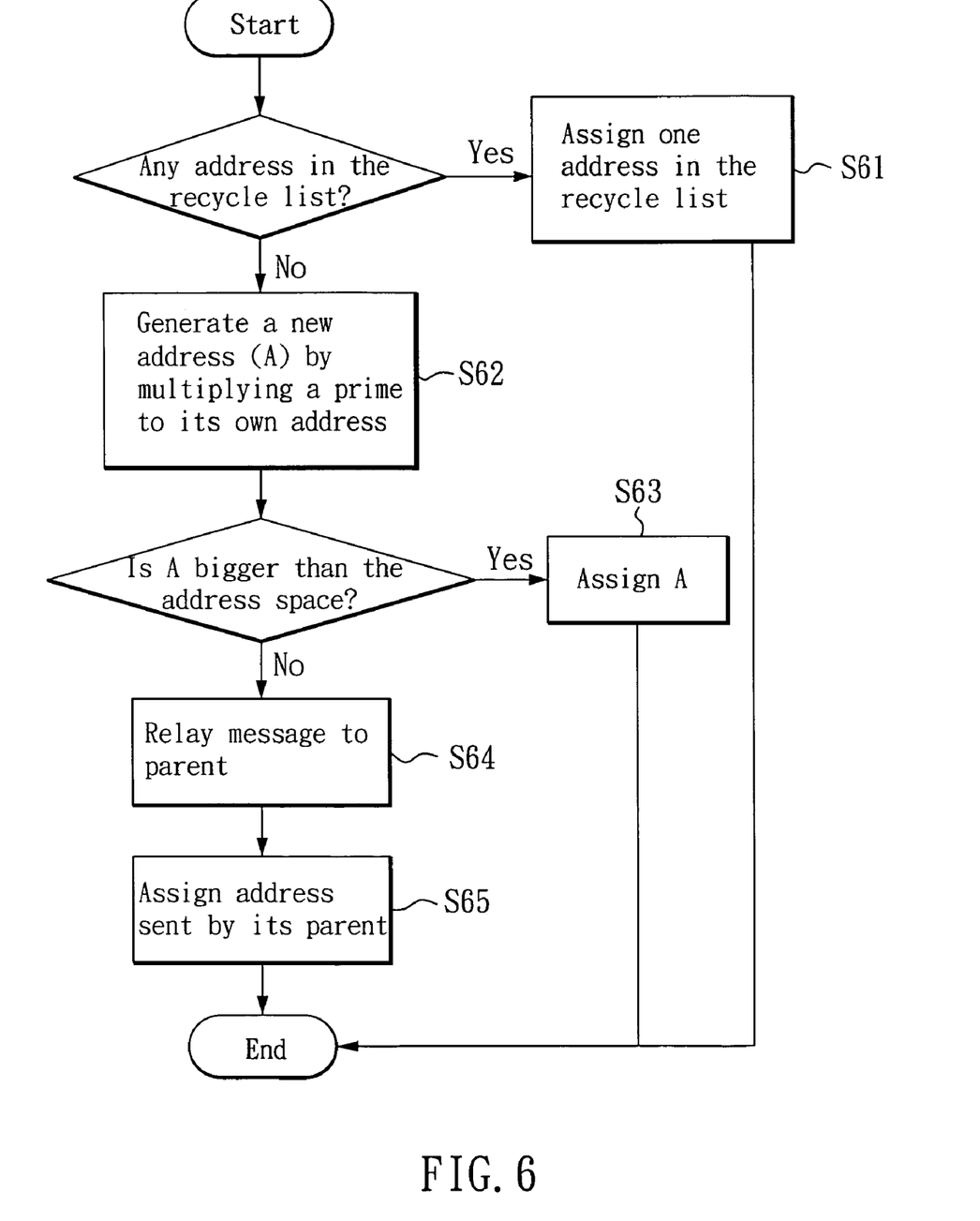
FIG. 6 is a flowchart of assigning an address to a new host in accordance with the unique numbering address allocation method in wireless multi-hop network of the present invention.

Based on the prime numbering address allocation method of FIG. 2, a logical address allocation tree, as shown in FIG. 3, can be established to allocate a unique address to each host. However, in practice, every host could move around in a multi-hop wireless network and/or leave the network after allocated an address. So the neighboring relationship in logical address allocation tree may differ from that in the real network topology. FIG. 4 gives an example of the network topology with an address space of 128 for those hosts in FIG. 3, which describes message flows of the prime numbering DHCP. These messages can be carried by any routing protocols in the wireless multi-hop network. Each host in the network is provided with an address record 41 for recording the addresses that have been allocated by this host, and a recycle list 42 for recording addresses that have been previously allocated, but not currently allocated, by this host. FIG. 5 shows the flow chart of acquiring an address for a new host. As shown in FIGS. 4 and 5, when a new host N joins in the network, it broadcasts a message for discovering neighbor (for example, DHCP_Discover request message) to its neighbor hosts (Step S51), as defined in DHCP. If there is no neighbor host existed and thus no response will be received, it is known that the new host N is the root and is configured with an address of 1. Otherwise, as in this example, upon receiving the requests from the new mobile host N, each of the neighbor hosts L, B, and F stops forwarding the message to the whole network but assigns an address according to the prime numbering address allocation method (Step S52). FIG. 6 further shows the flow chart of assigning an address based on the prime numbering address allocation method, in which the neighbor host assigns the smallest address in its recycle list 42 if there are addresses in the recycle list (Step S61). If there is no address in the recycle list 42, the neighbor host generates an address (A) by multiplying a prime number to its own address (step S62), and if this address (A) is not bigger than the address space, this address (A) is assigned by the neighbor host (Step S63); otherwise, the DHCP_Discover request message is relayed to its parent (Step S64) and the parent host assigns an address (Step S64). In this example, assuming that the neighbor hosts L, B, F do not have any address in their recycle lists, neighbor host F (with address=4) assigns an address=4×2=8, neighbor host B (with address=2) assigns an address=2×5=10, and neighbor host L (with address=30) assigns an address=30×5=150. However, the address=150 generated by neighbor host L is bigger than the address space 128. Therefore, neighbor host L sends DHCP_Discover request message to its parent host G for help and the parent host G generates an address 66 for neighbor host L.

After assigning an address, each of the neighbor hosts L, B, F sends a message for offering address (for example, DHCP_Offer message) embedded with such address 66, 10, 8 to the new host (N) (Step S53). Therefore, host N receives three DHCP_Offer messages with three available addresses, 66, 10, and 8 from hosts L (or G), B, and F respectively. It is noted that if host N receives no response (i.e., DHCP_Offer message), the host N is known to be the root host and is assigned with an address 1. After receiving three DHCP_Offer messages, host N chooses one of the addresses and broadcast its choice in the DHCP_Request message (step S54) to notify the chosen host of successful address allocation. Preferably, host N chooses the smallest address 8 to prevent the tree from growing too fast. Again, its neighbor hosts L, B, F stop forwarding the DHCP_Request messages, except the message relayed to parent host G by host L. Finally, the chosen host F updates its address record 41 and sends an acknowledge message (for example, DHCP_Ack message) to host N for confirmation (step S55). Consequently, the present invention is able to make DHCP_Offer and DHCP_Request message to be sent by one-hop broadcasting instead of whole-network broadcasting.

In order to avoid address leak problem, a host should perform graceful departure, which means it should release the address when it is going to leave the network or shutdown. For example, host K in FIG. 4 is leaving, so it sends a message for releasing address (for example, DHCP_Release message) to its parent host G. Host G then records the address 18 in its recycle list 42, and the addresses in the recycle list 42 will have higher priority to be assigned later. If the root is going to leave, it has to inform its greatest descendent, which has the largest allocated address in the network, to be the root. For example, the host M is the greatest descendent of the root host A in the FIG. 3.

In a wireless communication network, the radio-link may break or the mobile host may leave gracelessly; i.e., radio-link is broken without sending DHCP_Release message. To solve these exceptions, each host is set with a timer which starts to count when the sending host sends a message (which can be any message except the DHCP_Release message) to a destined host. If the timer expires and no response is received, the destined host is deemed as a graceless-departure host. For those hosts leaving gracelessly, their addresses can be recycled by their parent hosts after the DHCP lease time, but they might become not recyclable if their parent hosts leave the network also. Therefore, the present invention makes the root host A to periodically broadcast a message for recycling (example, DHCP_Recycle message) to ask all hosts for sending their current status, including assigned address and recycle list. By gathering statuses of existing hosts, the root host A can reconstruct the address allocation tree, and send the hosts their new recycle lists including graceless-departure hosts. The broadcasted DHCP_Recycle message could be piggy-backed in the message of routing protocol, DSDV for example, so no additional overhead will be launched for address recycle.

To evaluate the performance of the present invention, Table 1 shows the qualitative analysis of the proposed method (Prime DHCP) and other address allocation mechanisms. Assume the numbers of hosts and links are n and l, respectively, the diameter of the MANET is d, and the average transmission time between two adjacent hosts is t. For DHCP and MANETconf, it needs to perform server solicitation and DAD, so at least 2/hosts need to process signal packets and the latency is 4*t*d for an address allocation. Prophet and prime DHCP both send requests to neighbors only, so the average number of hosts involved in processing signal packets is the average degree (n/2) and the latency is 2t, assuming that the address space is sufficient enough. Furthermore, it is more complicate to maintain address uniqueness in both MANETconf and Prophet than in Prime DHCP. In addition, Prophet requires a large address space while others have no such limitation.

TABLE 1

Qualitative analysis of various address allocation mechanisms.

|  | DHCP | MANETconf | Prophet | Patent 20040174904 | Prime DHCP |
|---|---|---|---|---|---|
| Signal overhead | O(2l) | O(2l) | O(n/2) | O(N * n/2) | O(n/2) |
| Latency | O(4 * t * d) | O(4 * t * d) | O(2 * t) | O(N * 2 * t) | O(2 * t) |
| Complexity | Low | High | High | Low | Low |
| Address space | No limitation | No limitation | Large | No limitation | No limitation |

To realize how recycle period affects the address utilization, i.e., the percentage of the effective addresses that has been already assigned or can be assigned to the participating hosts, it is supposed that the arrival and departure of hosts follow the Poisson distribution with the mean rates λ and μ, and the address utilization, $U_k$, before the k-th recycle can represented as Equation (1), where N is the size of address space, $ñ(C_k)$ is the number of hosts in the MANET at the time of k-th recycle and $\overline{N}_{subtree}$ is the average number of descendants of a host.

$$U_k = 1 - \frac{ñ(C_k) \times \mu \times \text{graceless\_precentage} \times \overline{N}_{subtree}}{N} \quad (1)$$

Figure 7:
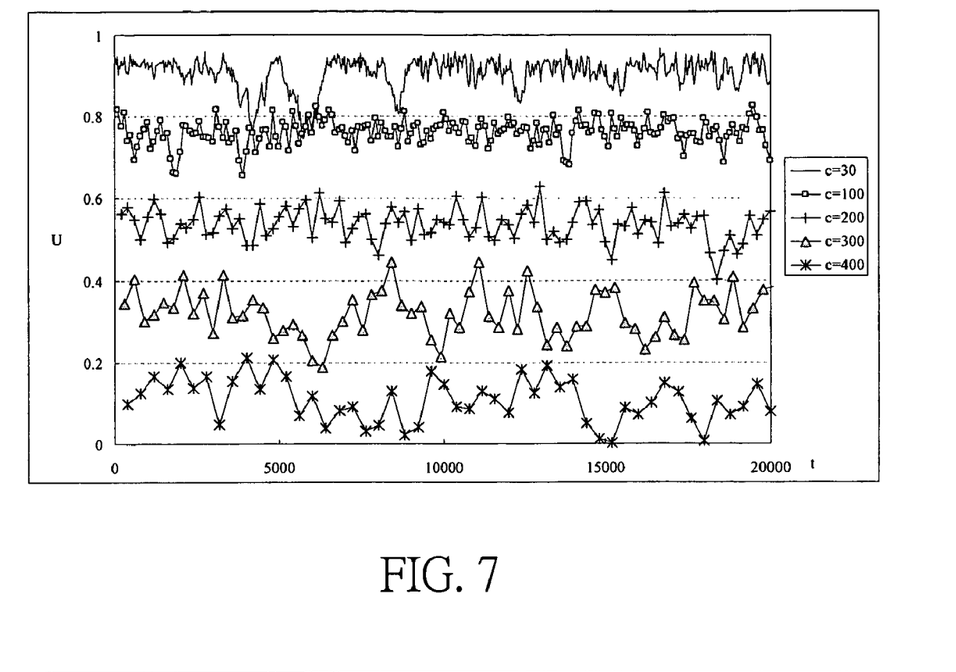
FIG. 7 is a diagram showing the effect of recycle period on the address utilization.
Figure 8:
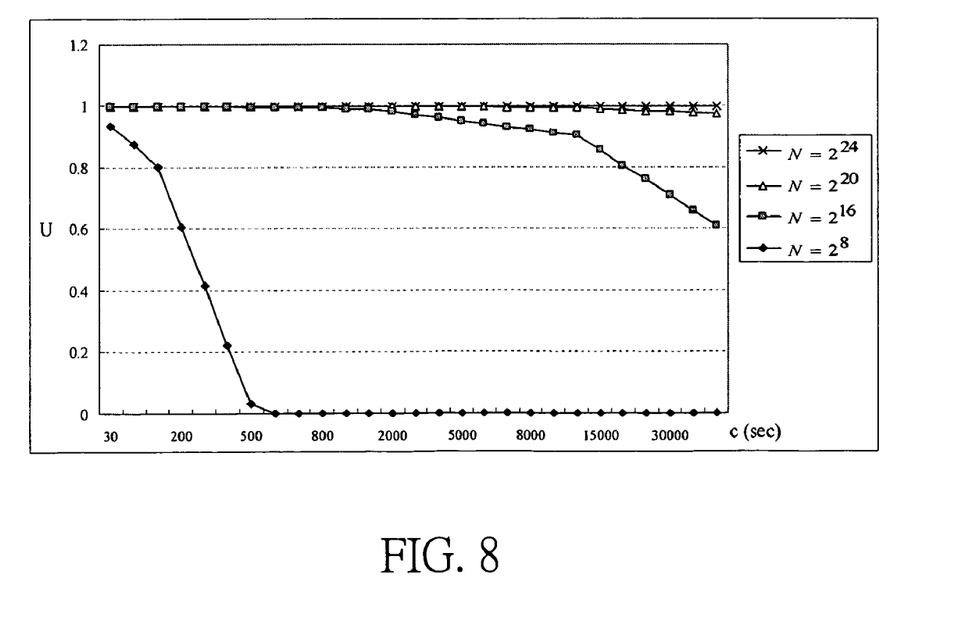
FIG. 8 is a diagram showing the effect of address space on the address utilization.

FIG. 7 shows the address utilization $U_k$ at different time instances for different recycle periods, where N=256, λ=0.8 and μ=0.9. As shown in FIG. 7, $U_k$ increases as the recycle period (c) becomes shorter, and is always greater than 0.8 if c is less than 30 seconds. FIG. 8 shows that although the utilization decreases as the recycle period increases, the speed of descent is slow if the address space is sufficient large. Therefore, address recycle introduces only slight overhead if the MANET has an address space greater than class B, and this could be achieved by configuring the MANET as a private network.

Other embodiments of the present invention will be apparent to those skilled in the art from consideration of the specification and practice of the present invention disclosed herein. It is intended that the specification and examples be considered as exemplary only, with a true scope and spirit of the present invention being indicated by the following claims.

What is claimed is:

1. A prime numbering address allocation method in wireless multi-hop network, comprising the steps of:
    assigning address 1 to a root host which is the first host joining the wireless multi-hop network;
    assigning, by the root host, all prime numbers sequentially to new hosts attached to the root host; and
    assigning, by a host that is not the root host, addresses as its own address multiplied by a prime number which starts from the biggest prime factor of its own address to new hosts attached to the host.

2. A unique numbering address allocation method in wireless multi-hop network, comprising:
    a neighbor discovering step, in which, when joining in the network, a new host broadcasts a message for discovering neighbor to its neighbor hosts, and the new host is assigned with an address 1 if no response is received;
    an address offering step, in which, upon receiving the message for discovering neighbors from the new host, each neighbor host assigns an address as its own address multiplied by a prime number which starts from the biggest prime factor of its own address and is next to the previous one allocated by the neighbor host, and sends a message for offering address embedded with the assigned address to the new host; and
    an address choosing step, in which, upon receiving the message for offering address, the new host chooses one of the assigned addresses as its address.

3. The method as claimed in claim 2, wherein in the address choosing step, the host chooses the smallest address from the assigned addresses.

4. The method as claimed in claim 2, further comprising: an address choice notifying step in which the new host broadcasts its choice in a message for address choice to its neighbor hosts to notify the chosen host of successful address allocation.

5. The method as claimed in claim 4, further comprising: an address confirming step in which the chosen host sends an acknowledge message to the new host for confirmation.

6. The method as claimed in claim 2, wherein in the address offering step, if there are addresses in a recycle list of the neighbor host, the neighbor host assigns one of the addresses in its recycle list.

7. The method as claimed in claim 6, wherein the neighbor host assigns the smallest address in its recycle list.

8. The method as claimed in claim 2, wherein in the address offering step, if the assigned address is bigger than a predetermined address space, the message for discovering neighbor is relayed to a parent host of the neighbor host and the parent host assigns an address, where the parent host is a host that allocates address to the neighbor host.

9. The method as claimed in claim 2, further comprising a graceful address releasing step in which, when a host is going to leave or shutdown, it sends a message for releasing address to its parent host and the parent host records the address of the leaving host in its recycle list, where the parent host is a host that allocates address to the leaving host.

10. The method as claimed in claim 2, further comprising a graceless address releasing step in which, when a host leaves without sending a message for releasing address, the address of the left host is recycled by its parent host if a host sends a message to it but receives no response within a predetermined period of time, where the parent host is a host that allocates address to the left host.

11. The method as claimed in claim 6, further comprising an address allocation reconstructing step in which the root host periodically broadcasts a message for recycling to ask all hosts for sending their assigned addresses and recycle lists, so as to reconstruct address allocation for all hosts.

12. The method as claimed in claim 2, wherein each host is configured as a DHCP proxy, the message for discovering neighbor is a DHCP_Discover request message, the response corresponding to the DHCP_Discover request message is a DHCP_Offer message, and the message for offering address is a DHCP_Offer message.

13. The method as claimed in claim 4, wherein each host is configured as a DHCP proxy, and the message for address choice is a DHCP_Request message.

14. The method as claimed in claim 5, wherein each host is configured as a DHCP proxy, and the acknowledge message is a DHCP_Ack message.

15. The method as claimed in claim 9, wherein each host is configured as a DHCP proxy, and the message for releasing address is a DHCP_Release message.

16. The method as claimed in claim 11, wherein each host is configured as a DHCP proxy, and the message for recycling is a DHCP_Recycle message.

* * * * *